United States Patent [19]

Bateman

[11] 4,060,793
[45] Nov. 29, 1977

[54] EXCESSIVE SINK RATE WARNING SYSTEM FOR AIRCRAFT

[75] Inventor: Charles Donald Bateman, Bellevue, Wash.

[73] Assignee: Sundstrand Data Control, Inc., Redmond, Wash.

[21] Appl. No.: 706,518

[22] Filed: July 19, 1976

[51] Int. Cl.² .................................................. G01C 5/00
[52] U.S. Cl. .................................. 340/27 R; 244/180; 343/7 TA; 343/112 CA
[58] Field of Search .................... 73/178 R; 235/150.2; 244/180, 183, 186–188; 318/583; 340/27; 343/7 TA, 112 CA, 112 A

[56] References Cited
U.S. PATENT DOCUMENTS

| | | | |
|---|---|---|---|
| 3,925,751 | 12/1975 | Bateman et al. | 340/27 R |
| 3,947,808 | 3/1976 | Bateman | 244/180 X |

OTHER PUBLICATIONS

The Sundstrand Ground Proximity Warning System, Advertising Circular, Sundstrand Data Control, Inc., 13-475.

Primary Examiner—Stephen G. Kunin
Attorney, Agent, or Firm—Michael McMurry; Ted Killingsworth; William Peoples

[57] ABSTRACT

In an aircraft ground proximity warning system that compares the rate of descent of an aircraft with its altitude above the terrain and in response thereto generates a warning signal when the aircraft's sink rate exceeds a predetermined limit for a particular altitude, a first type of advisory voice warning is generated for combinations of lesser descent rates and greater altitudes and a second type of imperative voice warning is generated for greater sink rates at lower altitudes where the danger of the aircraft impact with the terrain is more significant. In addition, the repetition rate of the advisory warning is increased as a function of increasing descent rate and the amplitude of the advisory warning can similarly be increased as function of increasing descent rate in order to call attention to an increasing undesirable operating condition.

20 Claims, 3 Drawing Figures

EXCESSIVE SINK RATE WARNING SYSTEM FOR AIRCRAFT

BACKGROUND OF THE INVENTION

The invention relates to the field of aircraft ground proximity warning systems and more particularly to systems providing warnings of excessive aircraft descent rates.

In a prior art systems, as represented by the U.S. Pat. Bateman, No. 3,946,358 and the U.S. Pat. Bateman, No. 3,947,808 each of which is assigned to assignee of this application, the relationship between altitude above ground and aircraft descent rate is utilized to generate a warning when the aircraft descent rate is excessive for its altitude above the terrain. In the U.S. Pat. No. 3,946,358, for example, an excessive descent rate warning system is disclosed that utilizes a linear relationship between aircraft altitude above terrain and aircraft descent rate wherein the greater the aircraft's altitude above the terrain, the greater the rate of descent that is required to activate the warning signal. In the excessive descent rate warning system disclosed in the U.S. Pat. No. 3,947,808, at descent rates above a predetermined value, a warning is generated for a selected time of impact with the ground assuming the aircraft continues at that particular descent rate.

However, studies of the actual operation of ground proximity warning systems, such as those disclosed in the U.S. Pat. No. 3,946,358 and the U.S. Pat. No. 3,947,808, have indicated that pilot acceptance and confidence in the ground proximity warning system is a substantial factor in judging the value of the system from a safety standpoint. For example, in most of the prior art ground proximity warning systems the nature of the warning is an imperative command to perform a corrective maneuver such as "pull-up." In a ground Proximity warning system such as disclosed in the U.S. Pat. No. 3,946,358 where the warning may have resulted from a number of different factors including: negative climb after take off; insufficient terrain clearance; excessive sink rate; excessive closure rate with the terrain or a below glideslope condition, the pilots are inherently reluctant to act immediately due to the fact that they do not know exactly what has caused the warning. Thus, it has been found in a significant number of cases that the pilots are reluctant to respond to a purely imperative type command when the condition causing the warning is not immediately apparent. In addition, there are a significant number of controlled flight into terrain type aircraft accidents where the aircraft's descent rate has rapidly increased near the ground due to windshear or optical illusions that affect the pilot's judgement. A study of a number of these types of accidents indicate that timely warnings could be provided if the prior art warning envelopes such as those disclosed in the U.S. Pat. No. 3,946,358 and the U.S. Pat. No. 3,947,808 could be extended to provide warnings for descent rates close to the terrain on the order of 1,000 feet per minute. Unfortunately, extending the warning envelope to detect descent rates on the order of 1,000 feet per minute at altitudes in the neighborhood of 100 feet or less would result in a substantial increase in the number of unwanted or nuisance warnings generated by the warning system thereby reducing the pilot's confidence in the warning system.

SUMMARY OF THE INVENTION

It is therefore an object of the invention to provide an excessive descent rate warning system wherein an essentially advisory voice warning is provided for descent rates at greater altitudes and imperative pull-up type voice warning is generated for comparable sink rates at lower altitudes.

It is an additional object of the invention to provide an excessive descent rate warning system having a sink rate warning for greater altitudes and a pull-up warning for lesser altitudes wherein the repetition rate of the sink rate warning increases proportionately as the aircraft penetrates the sink rate warning envelope.

It is further an object of the invention to provide an excessive descent rate warning system having a voice sink rate warning and a voice pull-up warning wherein the amplitude of the voice sink rate warning increases proportionately with an increase in the aircraft's penetration into the sink rate warning envelope.

It is yet another object of the invention to provide an excessive descent rate warning system wherein a sink rate advisory voice warning is generated when the aircraft is descending at a barometric sink rate in excess of approximately 1,000 feet per minute at altitude of 50 feet above the terrain and a corresponding pull-up warning is generated for greater sink rates at the same altitude.

Thus, the excessive descent rate warning system compares the aircraft barometric sink rate with the aircraft's altitude above the terrain, as typically measured by a radio altimeter, and generates sink rate warnings as a function of a predetermined relationship between barometric descent rate and aircraft altitude. An imperative type pull-up warning is generated in response to a second predetermined relationship between descent rate and altitude. In addition, the excessive descent rate warning system provides circuitry to increase the repetition rate of the sink rate warning as the aircraft continues to increase its penetration into the sink rate warning envelope. By the same token, circuitry is provided to increase the amplitude of the sink rate voice warning as the aircraft continues to increase its penetration of the sink rate warning envelope.

DETAILED DESCRIPTION OF THE INVENTION

Figure 1:
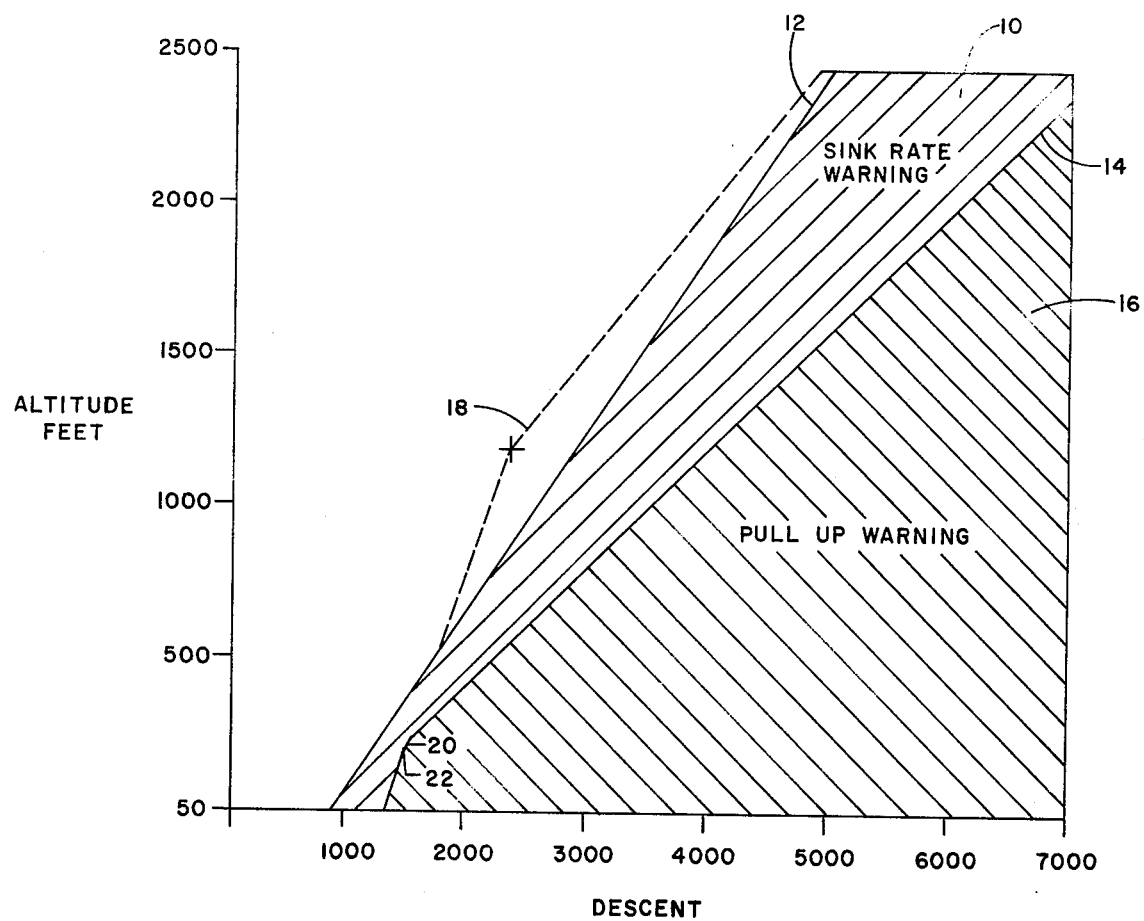
FIG. 1 is a graphic illustration of the warning envelopes or relationships between aircraft barometric descent rate and altitude above the terrain that will cause a sink rate warning or a pull-up warning to be generated.

A graphic illustration of both a sink rate warning envelope and a pull-up warning envelope for an excessive sink rate warning system is provided in FIG. 1. The cross-hatched area 10 located between lines 12 and 14 of FIG. 1 defines the combinations of radio altitude and sink rate that will trigger a sink rate warning. The cross-hatched area 16 beneath line 14 indicates those combinations of radio altitude and barometric altitude rate signals that will trigger a pull-up warning. The dashed line 18 represents the relationships between altitude and descent rate that would generate a warning signal in the prior art systems such as that disclosed in the U.S. Pat. No. 3,947,808. As illustrated by line 12 there is a linear relationship between altitude and descent rate required to generate the sink rate warning signal. As shown in FIG. 1 the barometric descent rate required to generate a sink rate warning signal increases with increasing altitude. By the same token, there is a generally linear relationship between descent rate and altitude required to generate the pull-up warning signal as indicated by line 4 of FIG. 1. However, it takes a greater descent rate for a given altitude to trigger a pull-up warning signal than to trigger the sink rate warning. With respect to the pull-up warning boundary as illustrated by line 14, the slope of the line 14 at point 20 changes at an altitude of approximately 187 feet and a sink rate of 1,468 feet per minute. The pull-up warning boundary line as indicated at 22 then takes on an increased slope. Thus it may be seen that at altitudes under 187 feet it will take a greater sink rate to generate the pull-up warning than would be the case if the sink rate warning boundary continued with the same slope as line 14. This will tend to reduce the number of nuisance pull-up type warnings but will, of course, still provide sink rate warnings at these lower altitudes and sink rates. Thus, it may be seen, when comparing the sink rate warning envelope 10 and the pull-up warning envelope 16 with the prior art warning curve 18, that warnings will be provided at altitudes as low as 50 feet with barometric sink rates as low as 1,000 feet per minute which were not available in the prior art systems as illustrated by line 18. Thus, the improved warning envelopes 10 and 16 disclosed in FIG. 1 will provide an excessive descent rate warning system in a number of situations wherein the prior art systems would not give a warning and yet do not result in the nuisance pull-up or imperative type warnings within this area.

Figure 2:
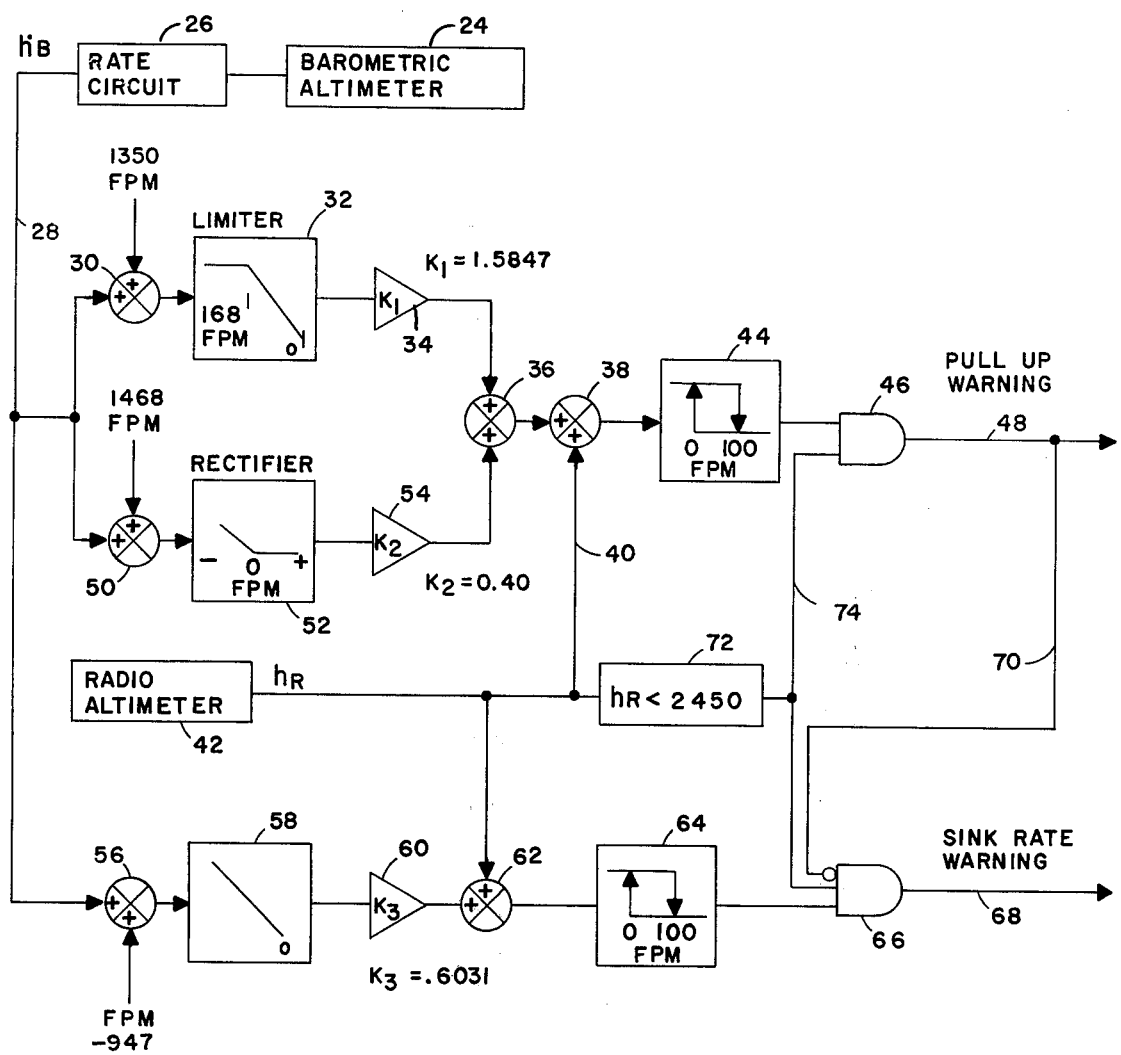
FIG. 2 is a functional block diagram of the logic circuitry for initiating sink rate and the pull-up warning signals.

In FIG. 2 of the drawings is illustrated a functional block diagram for a logic circuit for initiating both the sink rate and the pull-up warning signals. Aircraft descent rate in terms of barometric altitude is represented by the signal $\dot{h}_B$ which can be generated with a barometric altimeter 24 and a rate circuit 26 in the manner disclosed in more detail in the U.S. Pat. No. 3,946,358. The $\dot{h}_B$ signal, which is negative when the aircraft is descending, is inputted over a line 28 to one of the positive terminals of the summing junction 30. Another input to the summing junction 30 is a bias signal of positive polarity that represents an increase in altitude of 1,350 feet per minute. The sum of these two signals is then applied to a limiter 32 the function of which is to limit the magnitude of the biased $\dot{h}_B$ signal from the summing junction 30 to a maximum absolute value. In the preferred embodiment of the invention this will be a signal equal to a minus 168 feet per minute. The scaling amplifier 34 serves to multiply the output of the limiter 32 by a factor of 1.5847. The biased $\dot{h}_B$ signal, so scaled, is transmitted through a summing junction 36 to a summing junction 38 where it is combined with an $h_R$ signal on line 40 representing the aircraft's altitude above ground. The $h_R$ is preferably obtained from a radio altimeter 42 in order to provide an accurate measure of aircraft altitude above terrain. When the magnitude of the scaled $\dot{h}_B$ signal from the amplifier 34 exceeds the magnitude of the positive $h_R$ signal, the output of the summing junction 38 will be negative, which in turn, causes a detector 44 to generate a positive output or logic signal to an AND gate 46. When the AND gate 46 is enabled, a negative output from the summing junction 38 will result in a pull-up warning initiate logic signal on output line 48 of AND gate 46.

The $\dot{h}_B$ signal on line 28 is also used as input to a summing junction 50. Here the $\dot{h}_B$ signal is biased by a positive signal at another positive input of the summing junction 50 by a signal representing a rate of altitude change of 1,468 feet per minute. A rectifier 52 receiving the output of the summing junction 50 eliminates any positive voltage or signal from being applied to a second scaling amplifier 54. As a result, the scaling amplifier 54 will only have a signal applied to it when the aircraft rate of descent is greater than 1,702 feet per minute. The biased $\dot{h}_B$ signal from the rectifier 54 is scaled by a factor $K_2$ which is equal to 0.40. The scale factor $K_2$ is equal to the slope of the pull-up warning boundary line 14 as illustrated in FIG. 1. The scaled $\dot{h}_B$ signal from the second scaling amplifier 54 is combined with the limited $\dot{h}_B$ signal from the first scaling amplifier 34 in the summing junction 36. The combined $\dot{h}_B$ signals are added to the $h_R$ signal in the summing junction 38 to produce the warning curve defined by lines 14 and 22 of FIG. 1. As a result, when the input to the positive terminal of summing junction 38 from summing junction 36 is greater than the $h_R$ signal a pull-up warning initiate logic signal will be generated on line 48 assuming that AND gate 46 is enabled.

The $\dot{h}_B$ signal on line 28 is also applied to a summing junction 56 which in turn is biased by a signal representing a descent rate of 947 feet per minute. The resulting output from summing junction 56 is applied to limiter 58 and then to a scaling amplifier 60. The scaling amplifier 60 serves to scale the output of limiter 58 by a factor $K_3$ which in the preferred embodiment of the invention has a value of 0.6031 which corresponds to the slope of the sink rate warning boundary 12 of FIG. 1. The output of scaling amplifier 60 is applied to a positive terminal of a summing junction 62 along with the $h_R$ signal on line 40 which is applied to another positive terminal of summing junction 62. The output of 62 is applied to a detector circuit 64 which in turn will generate a positive logic signal to an input of AND gate 66. Thus, when the scaled output of the scaling amplifier 60 exceeds the $h_R$ signal a positive logic signal will be applied to AND gate 66 that when the AND gate 66 is enabled will result in a sink rate warning initiate logic signal on line 68 which is the output of AND gate 66.

In the logic circuitry of FIG. 2, the output of AND gate 46 is also applied through an inverting terminal to AND gate 66 by means of line 70. The purpose of this input is to inhibit the sink rate warning when the pull-up warning has been initiated. In addition, AND gates 46 and 66 also have logic inputs from a detector circuit 72 connected to line 40 which will generate a positive signal whenever $h_R$ is less than 2,450 feet. The object of this circuit is to provide signals on line 74 which will inhibit gates 46 and 66 whenever the aircraft's altitude above the terrain is greater than 2,450 feet.

Figure 3:
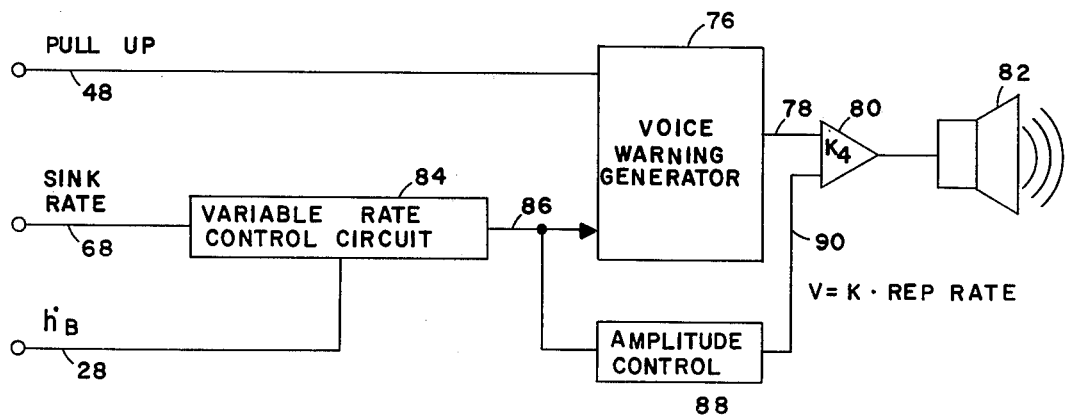
FIG. 3 is a functional block diagram of circuitry for implementing the sink rate and pull-up voice warnings.

In FIG. 3 of the drawings is illustrated in block diagram form a voice warning generator circuit for producing voice sink rate and pull-up warnings. At this point it should be noted that the terms "sink rate" and "pull-up" are the preferred terms to be used in the invention. However, they are used in addition to define the general nature of the intelligence being transmitted to the pilot by the excess descent rate warning system. Under certain circumstances, other terms may be appropriate to indicate the "sink rate" warning which is generally advisory in nature and the "pull-up" warning which is generally commanding or imperative in nature.

The circuit in FIG. 3 includes a voice warning generator 76 which is responsive to the pull-up logic initiate signal on line 48. Whenever a pull-up logic initiate signal is present on line 48, the voice warning generator will provide an analog signal as input over line 78 to the amplifier 80 which will result in audio voice signal being produced by a speaker 82. The sink rate logic initiate signal on line 68 is applied to a variable rate control circuit 84. A similar variable rate control circuit is disclosed in the U.S. Pat. Bateman et al, No. 3,925,751, assigned to assignee of this application. The variable rate control circuit responds to the $\dot{h}_B$ signal on line 28 by increasing the repetition rate of the sink rate signal on line 68. The output of the variable rate control circuit is applied on line 86 to the voice warning generator and will result in the output by the speaker 82 of the audio sink rate warning signal. As a result, when the aircraft is in the sink rate warning envelope 10 of FIG. 1, an increasing descent rate $\dot{h}_B$ will increase the repetition rate of the sink rate audio signal. An amplitude control circuit 88 is connected to line 86 and will generate a voltage on line 88 that is proportional to the repetition rate of the variable rate control circuit 84 output. The output of the amplitude control circuit on line 90 serves to control the gain $K_4$ of the amplifier 80 and thus will serve to increase the amplitude of the sink rate audio signal as output by the speaker 82 when the descent rate $\dot{h}_B$ is increasing.

It will be appreciated that the variable values for the curves in FIG. 1 and the gain factors and bias voltages in the circuit of FIG. 2 are for purposes of illustrating the preferred embodiment. The invention is not intended to be limited to these specific values since variation in aircraft types and performance may call for somewhat different values.

The analog logic or computer circuitry in FIGS. 2 and 3 is used to select the desired verbal warning as a function of descent rate and altitude. This same function can be performed by a digital computer having the same input interfacing with the voice warning generator 76.

I claim:

1. A warning system for use in aircraft having a source of signals representing the aircraft's barometric rate of descent and a source of signals representing the aircraft's altitude above terrain, comprising:
    means for comparing the aircraft's barometric rate of descent with the aircraft's altitude above the terrain;
    a first signal generating means, responsive to said comparing means, for generating a voice sink rate type of warning signal representing a condition wherein the aircraft is exceeding a descent rate according to a first predetermined, essentially linear, relationship between barometric descent rate and aircraft altitude above the terrain, wherein said first predetermined relationship has a slope of approximately 1,000 feet per minute for each 580 feet of altitude;
    and a second signal generating means, responsive to said comparing means, for generating a voice pull-up type of warning signal representing a condition wherein the aircraft is exceeding a descent rate amounting to a second predetermined relationship between barometric descent rate and aircraft altitude above the terrain wherein said second predetermined relationship requires a lesser descent rate for a given altitude above the terrain than said first predetermined relationship.

2. The warning system of claim 1 wherein said first predetermined relationship between descent rate and altitude will result in said first signal generating means generating said first a warning signal when the descent rate exceeds approximately 1,700 feet per minute for an altitude of 500 feet above the terrain.

3. The warning system of claim 1 wherein said first signal generating means additionally includes means for increasing the repetition rate of said voice sink rate warning a function of increasing descent rate for a given altitude.

4. The warning system of claim 1 additionally including means responsive to the altitude above the terrain signal to inhibit said sink rate warning signal when the aircraft is above a predetermined altitude above the terrain.

5. A warning system for use in aircraft having a barometric altimeter and a radar altimeter comprising:
    a circuit responsive to the barometric altimeter for generating a barometric altitude rate signal;
    a first comparator circuit responsive to said radar altimeter and said barometric rate signal effective to generating a first logic signal responsive to a first predetermined relationship between said barometric rate signal and altitude above ground;
    a circuit for generating a voice sink rate warning in response to said first logic signal;
    a second comparator circuit responsive to said radar altimeter and said second barometric rate signal effective to generate a second logic signal responsive to a second predetermined relationship between altitude and barometric descent rate;
    a circuit responsive to said logic signal for inhibiting said voice sink rate warning; and
    a circuit for generating a voice pull-up warning in response to said second logic signal.

6. The system of claim 5 additionally including a variable repetition rate circuit responsive to said barometric rate signal and operatively connected to said voice sink rate warning circuit for increasing the repetition rate of said sink rate signal as a function of increasing barometric descent rate.

7. The system of claim 6 additionally including a circuit operatively connected to said variable repetition rate circuit and said voice sink rate warning circuit for increasing the amplitude of said sink rate circuit as a function of said repetition rate.

8. An excessive descent rate warning system for use in aircraft having a source of signals representing the aircrafts barometric descent rate and a radio altimeter, comprising:
    means, responsive to the descent rate signal and the radio altimeter, for generating a voice sink rate advisory warning according to a first predetermined relationship between descent rate and radio altitude;
    means, responsive to the descent rate signal and the radio altimeter, for generating a voice pull-up type warning signal according to a second predetermined relationship between descent rate and radio altitude wherein said second predetermined relationship requires a greater descent rate for each altitude to generate said pull-up type warning than does said first predetermined relationship; and means for inhibiting said sink rate warning when said pull-up warning is generated.

9. The system of claim 8 wherein said sink rate warning means will generate said sink rate warnings for descent rates of 1,200 feet per minute at an altitude of 100 feet.

10. The system of claim 9 additionally including means responsive to the descent rate for varying the repetition rate of said voice sink rate warning as a function of the amount that the aircraft exceeds said first predetermined relationship.

11. The system of claim 10 additionally including means to increase the amplitude of said sink rate voice warning as a function of said repetition rate.

12. The system of claim 8 wherein said first predetermined relationship between descent rate and radio altitude is essentially linear.

13. The system of claim 12 wherein said first predetermined relationship has a slope of approximately 0.6 feet of altitude for each foot per minute of altitude descent rate.

14. The system of claim 8 wherein said voice warning generating means includes means to change said second predetermined relationship to a third predetermined relationship for descent rates above a predetermined value.

15. The system of claim 14 wherein said third predetermined relationship is essentially linear and has a slope of approximately 0.40 feet for each foot per minute of descent rate.

16. The system of claim 14 wherein said second predetermined relationship is essentially linear and has a slope of approximately 1.5 feet for each foot per minute of descent rate.

17. The system of claim 14 wherein said predetermined descent rate is approximately 1,500 feet per minute.

18. A warning system for use in aircraft having a source of signals representing the aircraft's barometric rate of descent and a source of signals representing the aircraft's altitude above terrain, comprising:
   means for comparing the aircraft's barometric rate of descent with the aircraft's altitude above the ground;
   a first signal generating means, responsive to said comparing means, for generating a voice sink rate type of warning signal representing a condition wherein the altitude aircraft is exceeding a descent rate according to a first predetermined relationship between barometric descent rate and aircraft altitude above the terrain;
   a second signal generating means, responsive to said comparing means, for generating a second type of warning signal representing a condition wherein the aircraft is exceeding a descent rate amounting to a second predetermined relationship between barometric descent rate and aircraft altitude above the terrain; and
   means for increasing the amplitude of said voice sink rate warning as a function of increasing descent rate for a given altitude.

19. The warning system of claim 18 wherein said first signal generating means additionally includes means for increasing the repetition rate of said voice sink rate warning as a function of increasing descent rate for a given altitude.

20. A warning system for use in aircraft having a source of signals representing the aircraft's altitude above terrain, comprising:
   means for comparing the aircraft's barometric rate of descent with the aircraft's altitude above the terrain;
   a first signal generating means, responsive to said comparing means, for generating a voice sink rate type of warning signal representing a condition wherein the aircraft is exceeding a descent rate according to a first predetermined relationship between barometric descent rate and aircraft altitude above the terrain, wherein said first predetermined relationship will cause said first signal generating means to generate said voice sink rate warning at a descent rate of 1,200 feet per minute for an altitude of 100 feet above the terrain; and
   a second signal generating means, responsive to said comparing means, for generating a voice pull-up type warning signal representing a condition wherein the aircraft is exceeding a descent rate amounting to a second predetermined relationship between barometric descent rate and aircraft altitude above terrain.

* * * * *